Dec. 24, 1929.    F. J. B. BERRY    1,740,761
MACHINE FOR ROCK OR COAL CUTTING
Filed Nov. 29, 1926    2 Sheets-Sheet 2

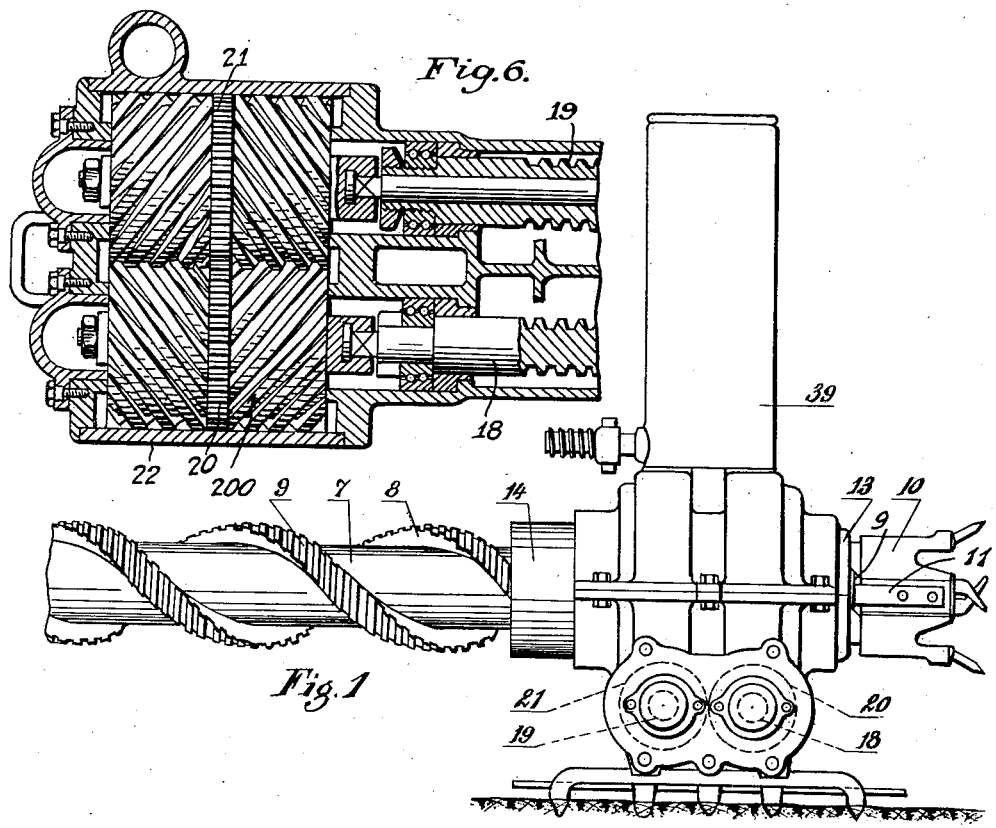
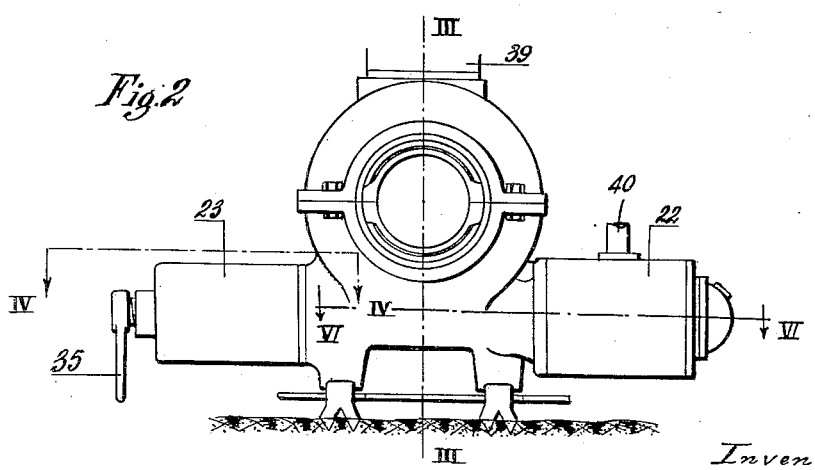

Inventor:
François Jacques Barthélemy Berry
By
Attorney

Patented Dec. 24, 1929

1,740,761

UNITED STATES PATENT OFFICE

FRANCOIS JACQUES BARTHELEMY BERRY, OF LILLE, FRANCE

MACHINE FOR ROCK OR COAL CUTTING

Application filed November 29, 1926, Serial No. 151,512, and in France June 21, 1926.

My invention relates to a machine adapted for rock cutting purposes, and chiefly for coal cutting and for the drilling of holes of fairly large size in the rock, so that the latter can be subsequently broken down with facility by the use of the hammer or like means.

My said machine essentially comprises a bar which is provided with a helical portion or rib and which carries at its forward end, by suitable connecting means, a head provided with cutting tools in the proper shape and number. The said bar extends through two rotatable sleeves whose speeds are slightly different and whereof one is provided with internal elements whereby the said bar may be rotated and the other forms a nut coacting with the bar whereby the latter may be given a lengthwise motion in either direction according as the difference in speed is positive or negative.

The said invention is disclosed in the following description with reference to the accompanying drawings which are given by way of example.

Fig. 1 is a side view of the machine and Fig. 2 a rear end view.

Fig. 6 is an enlarged horizontal section on line VI—VI of Fig. 2, showing the compressed-air motor which is used.

Figure 5:
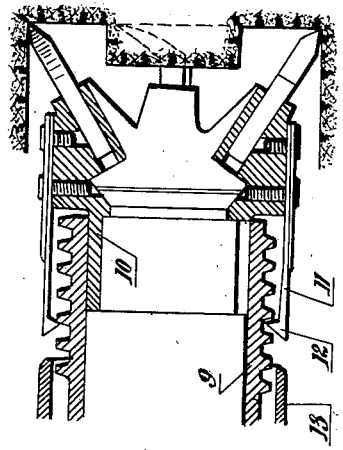
Fig. 5 is sectional view of the tool-carrying head of the machine.

As shown in the drawings, my said machine essentially comprises a bar 7 having at the periphery a helical element or rib 8 of large pitch, whose external edge 9 carries a screw thread of relatively small pitch. Upon the front end of the said bar is mounted a tool carrying head 10 whose connection with the bar is shown in Fig. 5.

The head 10 carries one or two rearwardly extending members 11, each ending in a catch 12 which co-operates with the thread 9 of the helical element 8. To remove the head 10 from the bar, the catches 12 are disengaged from the thread 9.

Figure 3:
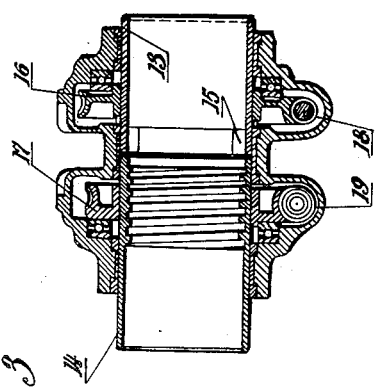
Fig. 3 is an axial section of the pair of sleeves, on the line III—III of Fig. 2.

The bar 7 extends through the two sleeves 13 and 14 (Figs. 1 and 3); the sleeve 13 carries the projections 15 coacting with the helical element 8 of the bar; the sleeve 14 is provided with an internal screw thread of the same pitch as the thread 9 of the bar, so that the said bar can be screwed into the said sleeve in the same manner as a bolt into a nut.

To the sleeves 13, 14 are secured the respective worm wheels 16, 17, coacting with the respective worms 18, 19. In the construction illustrated, the shafts of the worms 18, 19 carry the two coordinate rotors 20, 21 of a compressed-air motor 200, which is enclosed in a casing 22. As shown in Fig. 6, the said rotors are each formed with gearing consisting of sets of straight and helicoidal teeth, the corresponding sets of teeth on the two rotors meshing with each other. Compressed air is admitted between the rotors by way of a pipe 40 (Fig. 2), and is exhausted through an outlet which does not appear since it is located in the lower part of casing 22.

The machine is so constructed that the said sleeves will rotate at slightly different speeds. To obtain this result, I may provide a different number of teeth for the rotors 20, 21, or for the worm wheels 16, 17.

Figure 4:
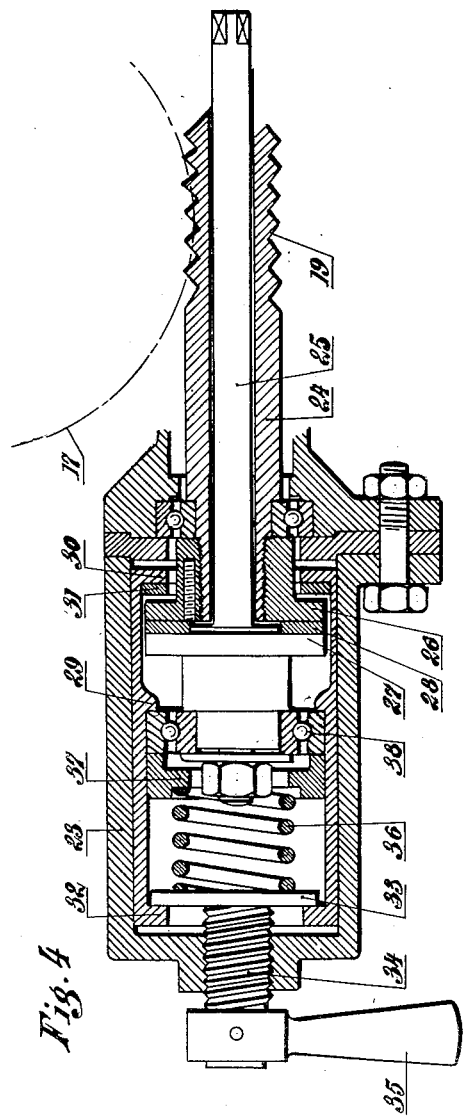
Fig. 4 is a section on the line IV—IV of Fig. 2.

To facilitate the control of the machine, I provide a friction coupling between the shaft of the rotor 21 and its worm 19 which is enclosed in the casing 23 (Fig. 2) as shown in section in Fig. 4. In this figure, 19 is the said worm engaging the worm wheel 17. The said worm is formed in one with a sleeve 24 surrounding the shaft 25 carrying the rotor 21; said sleeve and shaft carrying at their ends, respectively, a flange or disc 26 and a collar 27, between which is interposed a friction disc 28 that may be secured to either of the parts 26, 27.

The parts 26, 27 are surrounded by a cage 29 mounted in the said casing 23 and carrying at the rear of the flange or disc 26 a braking flange 30 provided with a facing member 31. At its front end, the said cage is formed with a flange 32 in contact with a disc 33 secured to a screw 34 which traverses the said casing and carries at the outer end an operating handle 35.

The spring 36 is interposed between the disc 33 and a ring 37 acting by means of a ball bearing 38 upon the end of the shaft 25 which is slidable to a slight degree in axial direction.

The operation of the coupling device is as follows:

When the handle 35 is turned in counter-clockwise direction, the cage 29 will be pulled forward by the action of disc 33 on flange 32, carrying with it the shaft 25, the collar 27 of which will recede from the flange 26, and the latter will make contact with the braking flange 31 of the cage 29, so that the worm 19 will no longer be actuated by the shaft 25, and it will also be braked and held in the fixed position. By reason of the friction members 28 and 31, the device will operate in an easy manner when proceeding from the operative to the stopping position and inversely.

The general operation of the machine is as follows:

The machine is supposed to have been brought to the place of work and into the position for the coal cutting, and for this purpose it is secured to the sides and the top of the gallery by means of a jack 39. The worm 19 is coupled to the shaft 25 and the motor 200 is set in operation, and the sleeves 13 and 14 will rotate at slightly different speeds.

The sleeve 13 rotates the bar 7 by means of the projections 15; the sleeve 14, which rotates at a different speed from that of the bar, will act upon the latter after the manner of a nut, and the bar will thus move forward as it rotates, so that the tools upon the head 10 will be enabled to bore into the coal or rock. By reason of its hollow form, the said bar is well adapted for the discharge of the material resulting from the operation.

When the hole has been bored to the proper depth, if the bar is to be brought to the rear, it is simply necessary to release the sleeve 14 by means of the handle 35, and since the said sleeve is now stationary and the bar continues to rotate by means of the sleeve 13, the said bar will be rapidly brought to the rear by reason of the screw thread 9. Should the head 10 make contact with the sleeve 13 due to a faulty operation, the catches 12 will be raised, and the head 10 will be entirely disengaged before any accident may happen. In this event the bar will be finally released from the sleeve 13, but no damage will result.

I claim—

1. A boring machine, comprising two rotary sleeves; an auger shaft extending through and operated by said sleeves; a compressed air motor embodying two coordinate intergeared rotors, one for each sleeve to drive the same; and a combined coupling and braking device interposed between one sleeve and the associated rotor.

2. A boring machine, comprising two rotary sleeves; an auger shaft extending through and operated by said sleeves; a compressed air motor embodying two coordinate intergeared rotors, one for each sleeve to drive the same; a worm on the shaft of each rotor; a worm wheel on each sleeve in mesh with the corresponding worm; and a combined coupling and braking device interposed between one sleeve and the associated rotor and embodying a collar on the rotor shaft, a flange on the stem of the worm, a spring for pressing said flange against said collar, a cage enclosing said collar, flange and spring and having a shoulder for cooperation with said flange, and an operating member for adjusting said cage.

In testimony whereof I affix my signature.

FRANCOIS JACQUES BARTHELEMY BERRY.